(12) United States Patent
Steiner et al.

(10) Patent No.: US 7,313,821 B1
(45) Date of Patent: Dec. 25, 2007

(54) SYSTEM, METHOD AND COMPUTER PROGRAM PRODUCT FOR CORRELATING INFORMATION FROM A PLURALITY OF SENSORS

(75) Inventors: Thomas C. H. Steiner, Linz (AT); Andreas Schlemmer, Steyr (AT); Johannes Mayr, Linz (AT)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 11/404,422

(22) Filed: Apr. 13, 2006

(51) Int. Cl.
*G06F 11/30* (2006.01)
*G06F 15/18* (2006.01)

(52) U.S. Cl. .................................................. 726/23
(58) Field of Classification Search ................. 726/23
See application file for complete search history.

(56) References Cited

U.S. PATENT DOCUMENTS

| | | | |
|---|---|---|---|
| 6,553,377 B1* | 4/2003 | Eschelbeck et al. | 707/10 |
| 6,553,378 B1* | 4/2003 | Eschelbeck | 707/10 |
| 6,567,808 B1* | 5/2003 | Eschelbeck et al. | 707/10 |
| 7,039,953 B2* | 5/2006 | Black et al. | 726/14 |
| 7,062,783 B1* | 6/2006 | Joiner | 726/23 |
| 7,154,857 B1* | 12/2006 | Joiner et al. | 370/245 |
| 2002/0046275 A1* | 4/2002 | Crosbie et al. | 709/224 |
| 2003/0188189 A1* | 10/2003 | Desai et al. | 713/201 |
| 2005/0257264 A1* | 11/2005 | Stolfo et al. | 726/23 |

OTHER PUBLICATIONS

Knowledgestorm, http://antivirus.knowledgestorm.com.
"Event Monitoring Enabling Responses to Anomalous Live Disturbances (EMERALD)," http://www.sdl.sri.com/projects/emerald.

* cited by examiner

*Primary Examiner*—Christian La Forgia
(74) *Attorney, Agent, or Firm*—Zilka-Kotab, PC; Christopher J. Hamaty

(57) ABSTRACT

A security system, method and computer program product are provided. In use, information from a plurality of sensors associated with at least one computer is received, where such information relates to events that have occurred at the at least one computer. Thereafter, the information is correlated, and a reaction is conditionally performed based on the information.

19 Claims, 7 Drawing Sheets

SYSTEM, METHOD AND COMPUTER PROGRAM PRODUCT FOR CORRELATING INFORMATION FROM A PLURALITY OF SENSORS

FIELD OF THE INVENTION

The present invention relates to security applications, and more particularly to distributed security systems.

BACKGROUND

Increasingly, computer systems have needed to protect themselves against undesirable computer code. Such undesirable computer code has generally taken the form of viruses, worms, Trojan horses, spyware, adware, and so forth. The damage and/or inconvenience capable of being incurred by these types of undesirable code has ranged from mild interference with a program, such as the display of an undesirable political message in a dialog box, to the complete destruction of contents on a hard drive, and even the theft of personal information.

Many security applications have been developed for combating the above undesirable computer code. Traditionally, such security applications operate in an isolated manner. Specifically, each component is specialized for its domain and is optimized to operate with high efficiency and low false alarm rates. As a result, few promising strategies have been developed to incorporate cooperation amongst the components in a universal and global way.

Some of the current approaches propose standards for security alert exchange protocols and data collection endpoints which are not flexible enough to cope with the introduction of arbitrary new components without reprogramming core functionality. Other approaches focus only on processing data within a single enterprise without trying to benefit form worldwide security alert information. Unfortunately, such systems leave much to be desired.

There is thus a need for overcoming these and/or other problems associated with the prior art.

SUMMARY

A security system, method and computer program product are provided. In use, information from a plurality of sensors associated with at least one computer is received, where such information relates to events that have occurred at the at least one computer. Thereafter, the information is correlated, and a reaction is conditionally performed based on the information.

DETAILED DESCRIPTION

Figure 1:
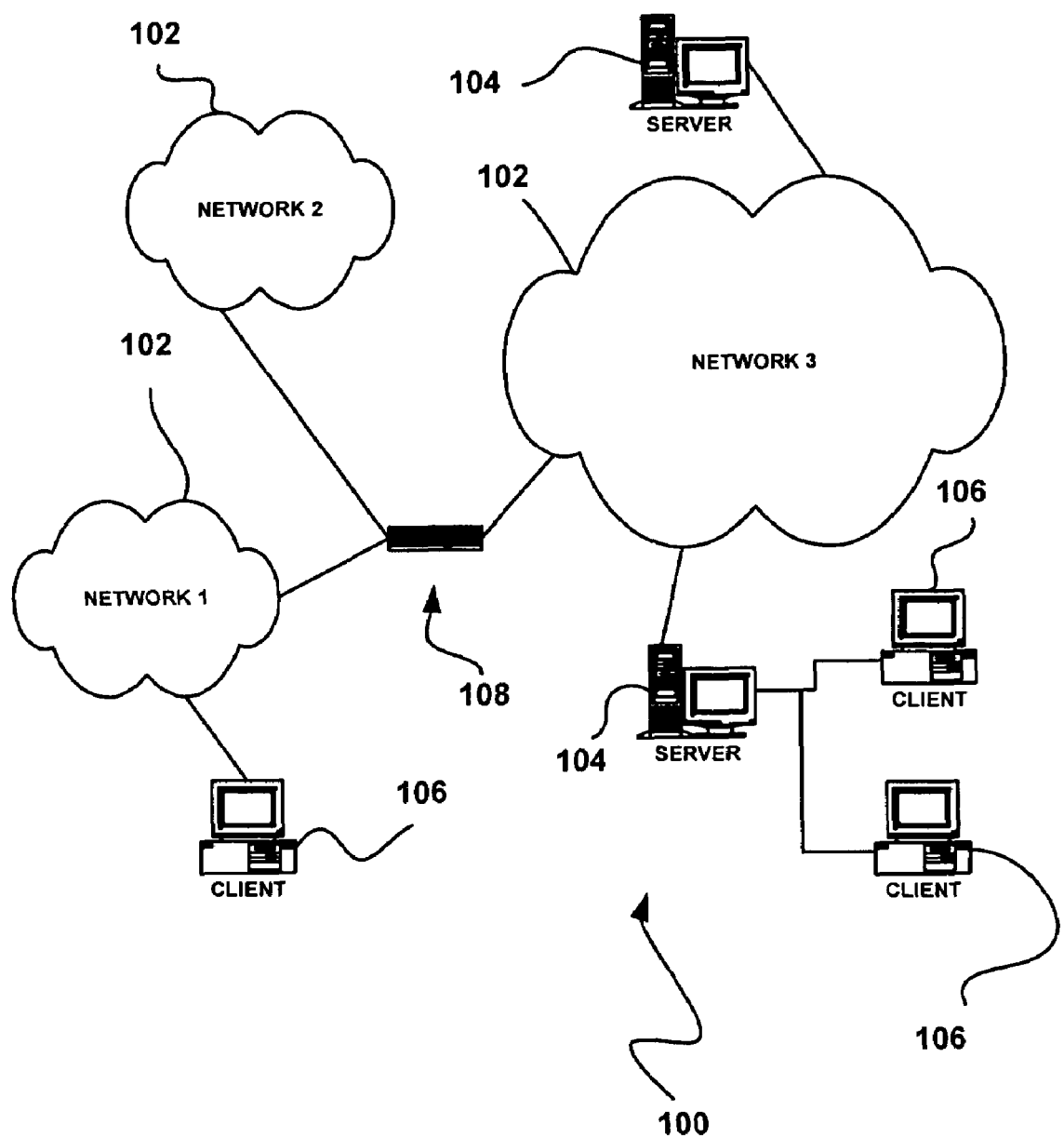
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are server computers 104 which are capable of communicating over the networks 102. Also coupled to the networks 102 and the server computers 104 is a plurality of client computers 106. Such server computers 104 and/or client computers 106 may each include a desktop computer, lap-top computer, hand-held computer, mobile phone, hand-held computer, peripheral (e.g. printer, etc.), any component of a computer, and/or any other type of logic. In order to facilitate communication among the networks 102, at least one gateway 108 is optionally coupled therebetween.

Figure 2:
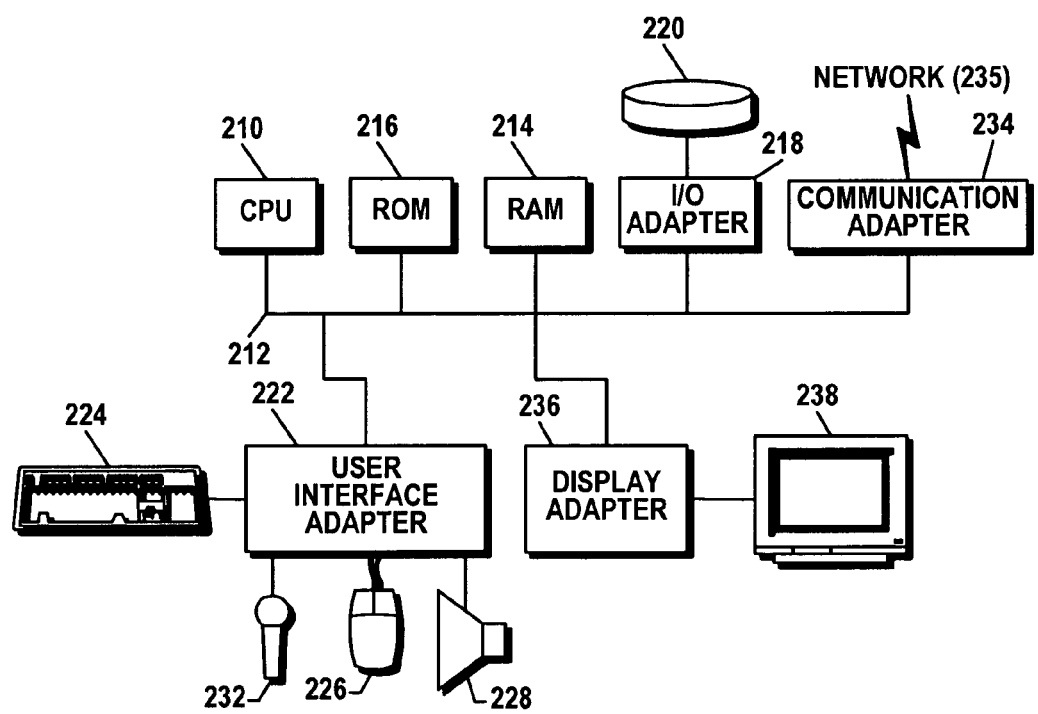
FIG. 2 shows a representative hardware environment that may be associated with the server computers and/or client computers of FIG. 1, in accordance with one embodiment.

FIG. 2 shows a representative hardware environment that may be associated with the server computers 104 and/or client computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
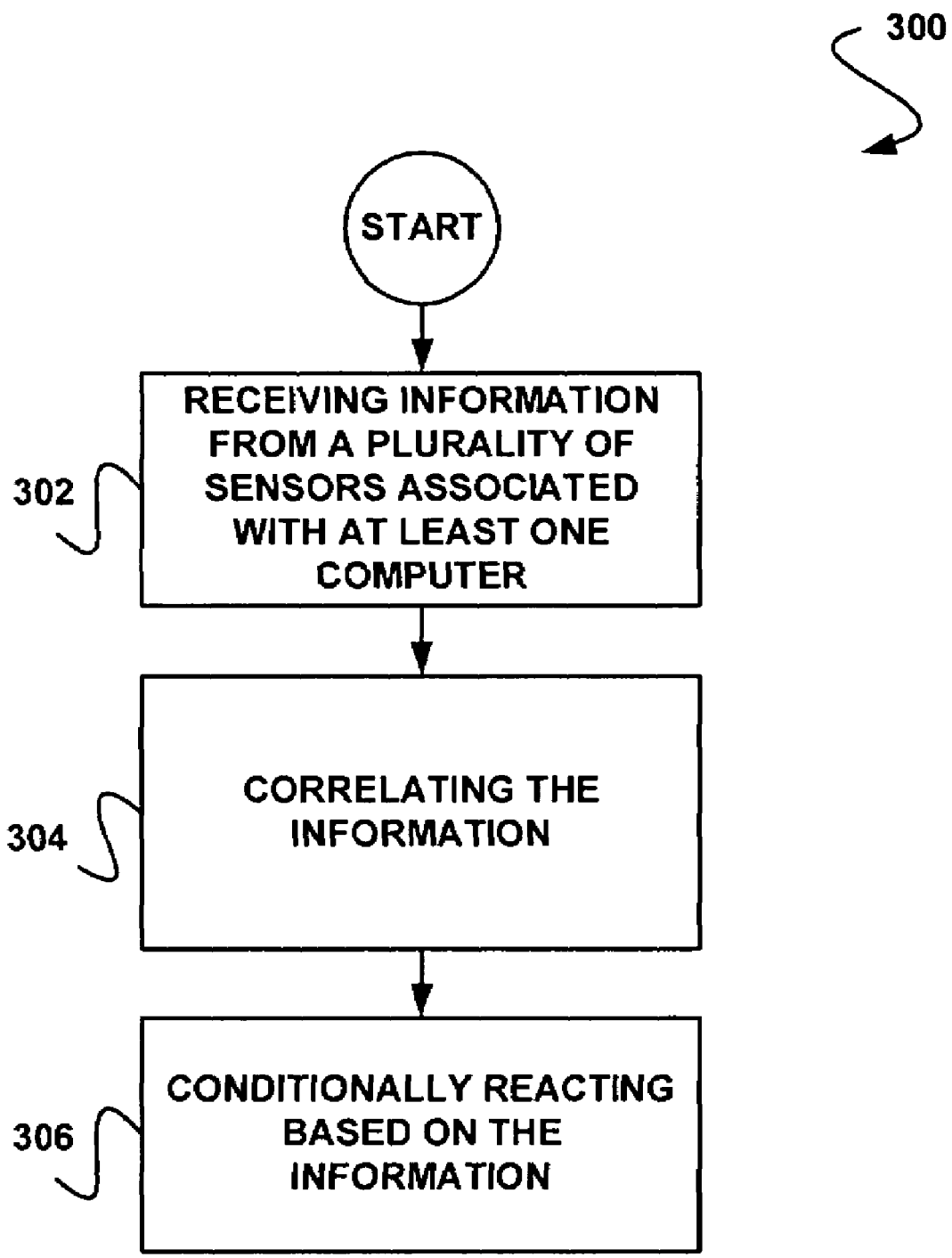
FIG. 3 shows a method for correlating and acting on information from a plurality of sensors, in accordance with one embodiment.

FIG. 3 shows a method 300 for correlating and acting on information from a plurality of sensors, in one embodiment. As an option, the method 300 may be implemented in the context of the architecture and environment of FIGS. 1 and/or 2. Of course, however, the method 300 may be carried out in any desired environment.

Initially in operation 302, information is received from a plurality of sensors associated with at least one computer (e.g. see, for example, the server computers 104, client computers 106, gateway 108 of FIG. 1, etc.). In one embodiment, the information may be detected by the plurality of sensors. The information may further include, but is not limited to, current state and/or behavioral information associated with the at least one computer and/or a network connected to the at least one computer. Still yet, the information may include alerts associated with the current state and/or behavioral information, where the alerts identify potentially undesirable activity. For example, such undesirable activity may include activity indicative of malware (e.g. a virus, Trojan, worm, etc.), spyware, adware and/or any other types of undesirable computer code, but of course may also include any type of activity that may be undesirable. In some embodiments, such undesirable activity may optionally be defined utilizing a policy associated with the at least one computer. While the above information examples are set forth for illustrative purposes, it should be noted that, in the context of the present description, the information may relate to any events that have occurred at the at least one computer.

The sensors may include software processes, hardware units and/or any other entity capable of identifying the information associated with at least one computer. In one embodiment, the sensors may include software products (e.g. firewall products, virus scanner products, etc.), device drivers, watchguard programs, etc. Furthermore, the sensors may each be associated with a single corresponding computer. Of course, multiple sensors may be associated with a single computer, and/or a single sensor may be associated with multiple computers.

In any such configuration, the sensors may monitor events at the computer(s) or computer component thereof with which they are associated and collect information based on such computer events. Just by way of example, the sensors may monitor and collect information on launched executables, such as executables executed from an electronic mail application, etc. Of course, the sensors may monitor any one type of event, multiple types of events, etc.

The received information is then correlated, as shown in operation 304. The information may be correlated by generating a summary map of the received information or a derivative of such map. One example of such summary map will be described in further detail with respect to FIG. 7. Of course, the information may be correlated in any desired manner that results in a correlation thereof.

Next, a reaction is conditionally performed based on the correlated information. See operation 306. For example, sensors may be selectively identified and instructed to monitor and analyze specific types of events. In addition, the identified sensors may be instructed to respond to specified events. In particular, the identified sensors may be instructed to prevent the specified events, quarantine data associated with the specified events, delete processes associated with the specified events and/or any other types of reaction capable of being taken based on the information.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
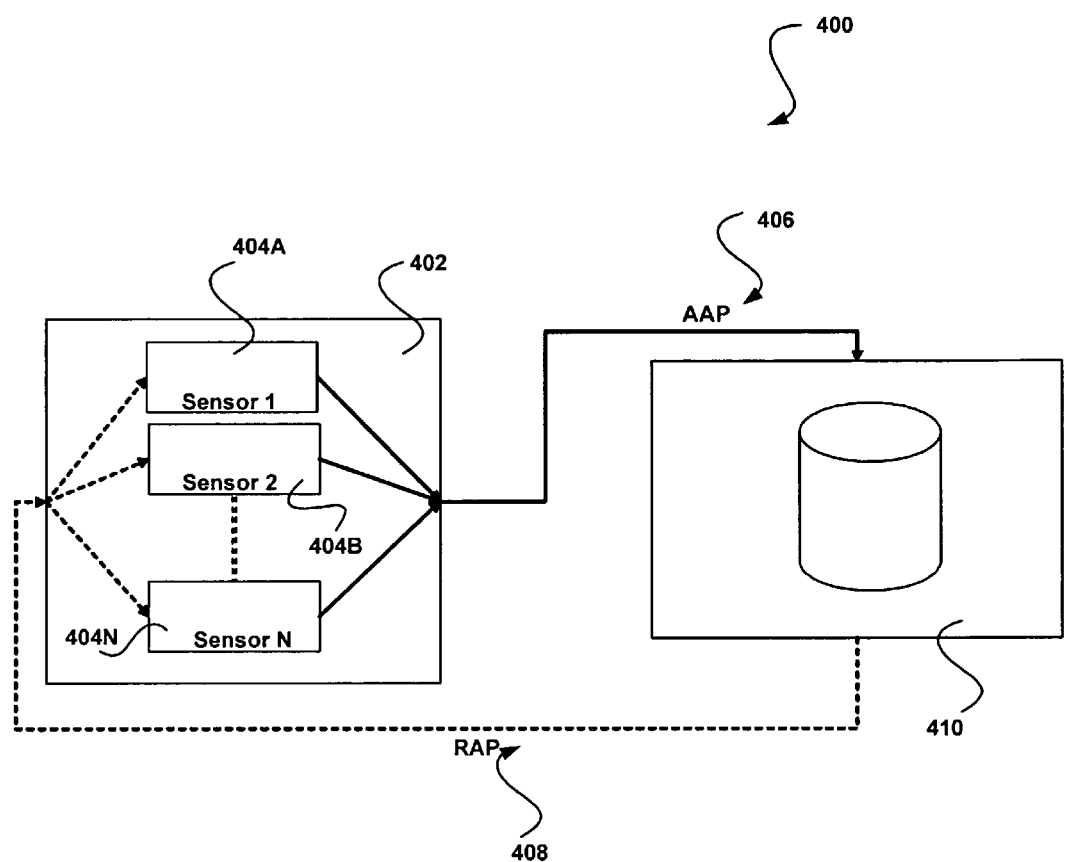
FIG. 4 shows a method for correlating and acting on information from a plurality of sensors, in accordance with another embodiment.

FIG. 4 shows a method 400 for correlating and acting on information from a plurality of sensors, in accordance with another embodiment. As an option, the method 400 may be implemented in the context of the architecture and environment of FIGS. 1-3. Of course, however, the method 400 may be carried out in any desired environment. It should also be noted that the aforementioned definitions may apply during the present description.

As shown, a hardware device 402 includes a plurality of sensors 404A-N. Of course, as described above with respect to FIG. 3, the hardware device may optionally include only a single sensor. In use, the sensors 404A-N collect information associated with the hardware device 402, and send the information, in the form of an alert, for example, to a correlation unit 410. See operation 406.

As an option, the sensors 404A-N may filter the information prior to sending the information to the correlation unit 410. Specifically, the sensors 404A-N may identify the information, evaluate the information and rate the information, whereby the sensors 404A-N only send out information that meet a predetermined rating. Of course, it should be noted that any desired method of rating information may be used. In this way, time is optionally not wasted receiving and subsequently correlating insignificant information at the correlation unit 410.

In some embodiments, the sensors 404A-N translate the information into an abstract form prior to sending the information to the correlation unit 410. Such abstract form may include a transformed (e.g. compressed, etc.) and/or universal format. Further, translating the information may also include encrypting the information. Thus, a specific abstract transmission protocol [e.g. Alert Abstraction Protocol (AAP), etc.] may transport the information in abstract form from the sensors 404A-N to the correlation unit 410.

In the context of one particular example, the information may be transmitted to the correlation unit 410 as an n-dimensional data vector. The components of the data vector may optionally be numerical. In particular, the information may be scrambled, hashed, translated, etc. into alphanumerical data using any desired algorithm prior to being transmitted to the correlation unit 410. Providing the information as an alphanumerical data vector may ensure privacy and ultimately facilitate any correlation performed. Specifically, a numerical format may provide extensibility such that information from any type of product and/or hardware device may be translated into a common format capable of being read by the correlation unit 410.

Additionally, the aforementioned information may be transmitted with a severity indicator, location information for routing, a timestamp and/or a sensor type. Of course, such information may be transmitted with any other desired type of additional information. Table 1 illustrates one optional example of components of an alphanumerical data vector.

TABLE 1

| [1:1] 18CFA2DE |
| [7:2] F8CE111 |

Table 1 shows two components of an alphanumerical data vector. The first component includes the "[1:1] 18CFA2DE" and the second component includes the "[7:2] F8CE111." Each component may include an alphanumeric type identifier and an associated value. In the example of Table 1, the alphanumeric type identifiers include the "[1:1]" and the "[7:2]." Further, the associated values include the "18CFA2DE" and "F8CE111."

The alphanumeric type identifiers may describe the meaning of their associated values. For example, the alphanumeric type identifiers may consist of class and subclass identifiers. Thus, in the example of Table 1, the "[1:1]" alphanumeric type identifier may identify the associated value (i.e. "18CFA2DE") as being a file name (e.g. the first number in the alphanumeric type identifier) that is on a disk (e.g. the second number in the alphanumeric type identifier). As another example, a "[1:2]" alphanumeric type identifier may identify an associated value as being a file name of an executed process. Of course, the alphanumeric type identifiers may identify any type of information capable of being detected by a sensor.

In addition, the associated values may include the information detected by a sensor. For example, such associated values may include a hashed file name, a port number, a source internet protocol address, a destination internet protocol address, and/or any other information capable of being detected by a sensor. Utilizing alphanumerical data vectors to represent information received from sensors may allow for correlation units to directly correlate alphanumerical data vector components, and therefore the information, by any portion of their alphanumeric type identifiers. For instance, all alphanumeric type identifiers of the same class may be directly correlated. On the other hand, information of differing alphanumeric type identifiers may require heuristics to determine if there is any correlation.

As described above, the correlation unit 410 may receive the information and correlate the information. Specifically, the correlation unit 410 may correlate the information using a summary map, which will be described in further detail with respect to FIG. 7. Based on the information received at the correlation unit 410, the correlation unit may determine that a response is necessary. For example, if any information received from the sensors 404A-N is capable of being correlated, the correlation unit 410 may determine that undesirable activity, such as an attack for example, is taking place. The correlation unit 410 may then respond by transmitting instructions to sensors associated with the correlated information. See operation 408.

As described above with respect to the n-dimensional data vector format that may be used to transmit information from the sensors 404A-N to the correlation unit 410, such n-dimensional data vector format may also be used to transmit instructions from the correlation unit 410 to the sensors 404A-N. Additionally, such instructions may be transmitted with a severity indicator, location information for routing, a timestamp and/or a sensor type. Of course, the instructions may be transmitted with any desired type of information. Furthermore, another abstract transmission protocol specific to the instructions [e.g. Response Abstraction Protocol (RAP), etc.] may be utilized to transmit the instructions. Such abstract transmission protocol may also have a universal and/or transformed (e.g. compressed, etc.) format.

As described above, sensors may be selectively identified and instructed to monitor and analyze specific types of events. In addition, the identified sensors may be instructed to respond to specified events. In particular, the identified sensors may be instructed to prevent the specified events, quarantine data associated with the specified events, terminate processes associated with the specified events and/or any other types of reactions capable of being taken with respect to the specified events.

Thus, the method 400 provides a way for a plurality of sensors 404A-N to collect and filter information and then send the information to a correlation unit 410. The correlation unit 410 may then be utilized to correlate the information to identify any potentially undesirable activity. Finally, the correlation unit 410 may instruct the sensors 404A-N on how to react to specific information that has been collected by the sensors 404A-N.

Figures 5A, 5B:
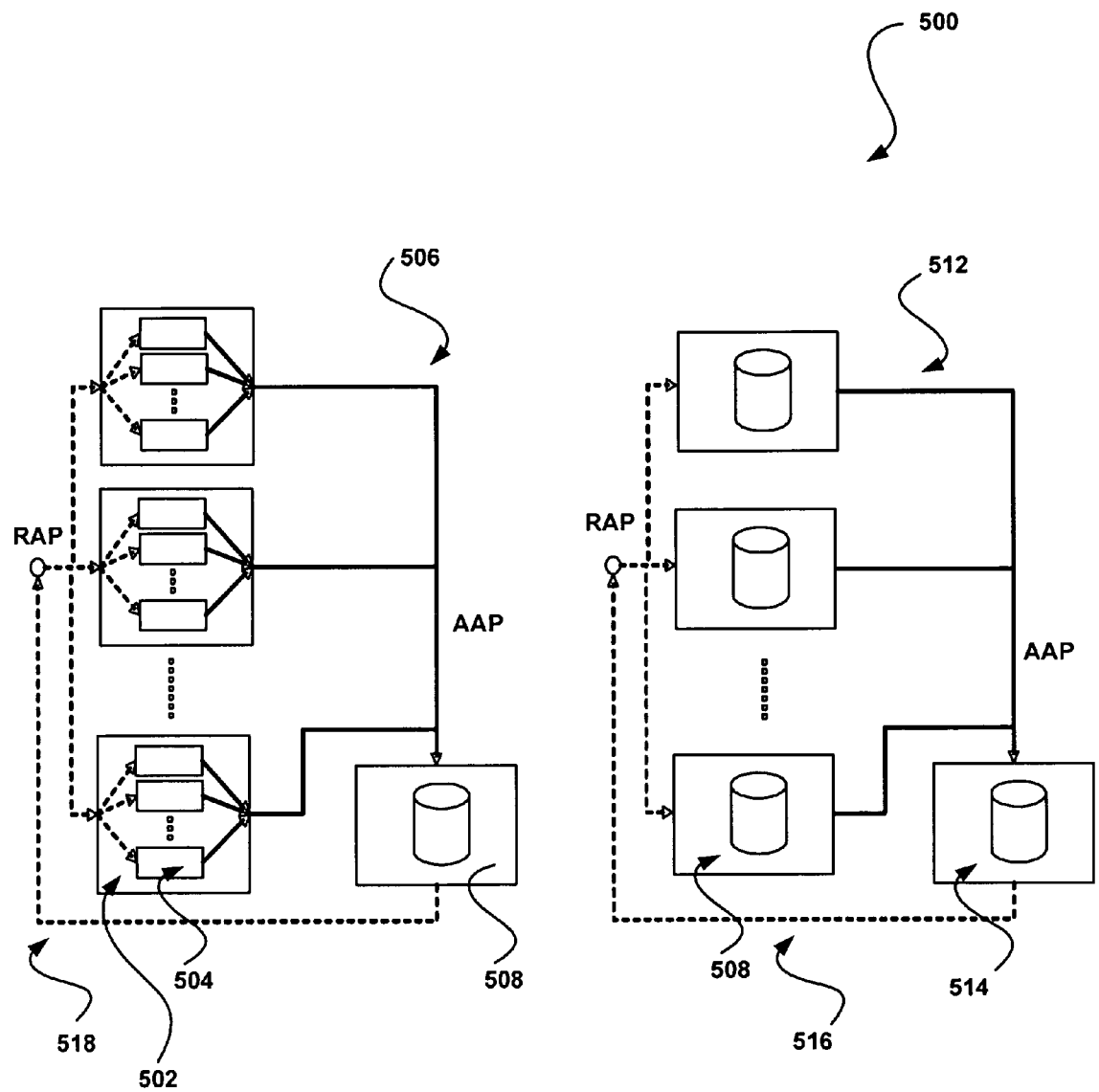
FIGS. 5A-B show a method for correlating and acting on information from a plurality of sensors utilizing a hierarchical configuration of a plurality of correlation units, in accordance with yet another embodiment.

FIGS. 5A-B show a method 500 for correlating and acting on information from a plurality of sensors utilizing a hierarchical configuration of a plurality of correlation units, in accordance with yet another embodiment. As an option, the method 500 may be implemented in the context of the architecture and environment of FIGS. 1-4. Of course, however, the method 500 may be carried out in any desired environment. It should also be noted that the aforementioned definitions may apply during the present description.

As shown, multiple hardware devices 502 each include a plurality of sensors 504. The sensors 504 collect information associated with the hardware devices 502 and transmit the information 506 to a correlation unit 508. The correlation unit 508 correlates the information, for example in the form of a summary map, and transmits the correlated information (e.g. summary map) to an additional correlation unit 514 at a next hierarchical level. See operation 512. Such transmission may optionally continue until a correlation unit at a highest hierarchical level receives the correlated information.

In this way, multiple correlation units may each receive and correlate information from multiple sensors and then transmit their individual correlated information to a higher level correlation unit for that individual correlated information to be correlated. This therefore prevents a single correlation unit from being burdened with the amount of time and resources that would otherwise be needed to correlate information from a vast amount of sensors.

As shown, the additional correlation unit 514 further correlates the correlated information received from each intermediate correlation unit 508, and determines whether any response is necessary in view of the correlation. If a response is necessary, the additional correlation unit 514 transmits instructions to the intermediate correlation units 508 (see item 516) who then transmit the instructions to their associated sensors 504 (see operation 518).

Figure 6:
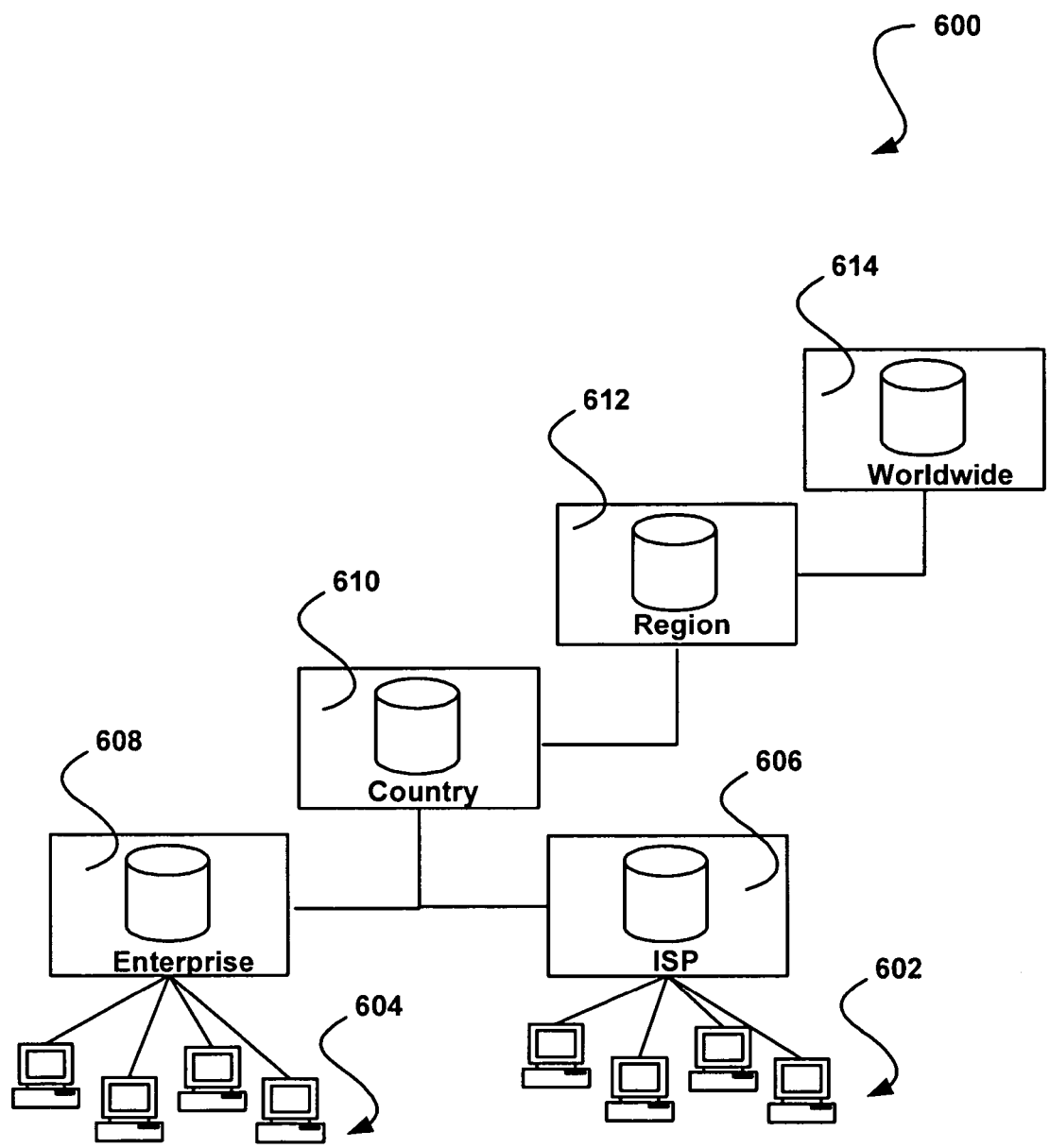
FIG. 6 shows a hierarchical configuration of a plurality of correlation units, in accordance with still yet another embodiment.

FIG. 6 shows a hierarchical configuration 600 of a plurality of correlation units, in accordance with still yet another embodiment. As an option, the hierarchical configuration 600 may be implemented in the context of the architecture and environment of FIGS. 1-5. Of course, however, the hierarchical configuration 600 may be used in any desired environment. It should also be noted that the aforementioned definitions may apply during the present description.

As shown, two groupings of devices 602 and 604 are each associated with a correlation unit. The first group of devices 602 is associated with an Internet Service Provider (ISP) correlation unit 606, whereas the second group of devices 604 are associated with an Enterprise correlation unit 608. The ISP correlation unit 606 and the Enterprise correlation unit 608 are both associated with a Country correlation unit 610. In addition, the Country correlation unit 610 is associated with a Region correlation unit 612 which is further associated with a Worldwide correlation unit 614. Of course, such hierarchy of correlation units is shown by way of example only, and may be configured in any manner utilizing any types of correlation units desired.

Thus, correlated information may be transmitted from a local level up to a worldwide level, where each hierarchical level of correlation units collects and correlates information from a plurality of correlation units and/or sensors. In this way, the highest hierarchical level correlation unit may receive any and all correlated information for generating the most appropriate and informed response to the information. As an option, the correlation units at each hierarchical level may filter received information based on predefined policies, such that the highest hierarchical level correlation unit is not inundated with information.

In addition, information that is transmitted from the lowest hierarchical level of correlation units to the highest hierarchical level of correlation units may include routing information. The routing information may identify source sensors and destination correlation units by each level of the hierarchy such that any instructions passed down from the highest hierarchical correlation unit may utilize the routing information to follow the same route taken, thus providing the instructions to the applicable correlation units and sensors.

Figure 7:
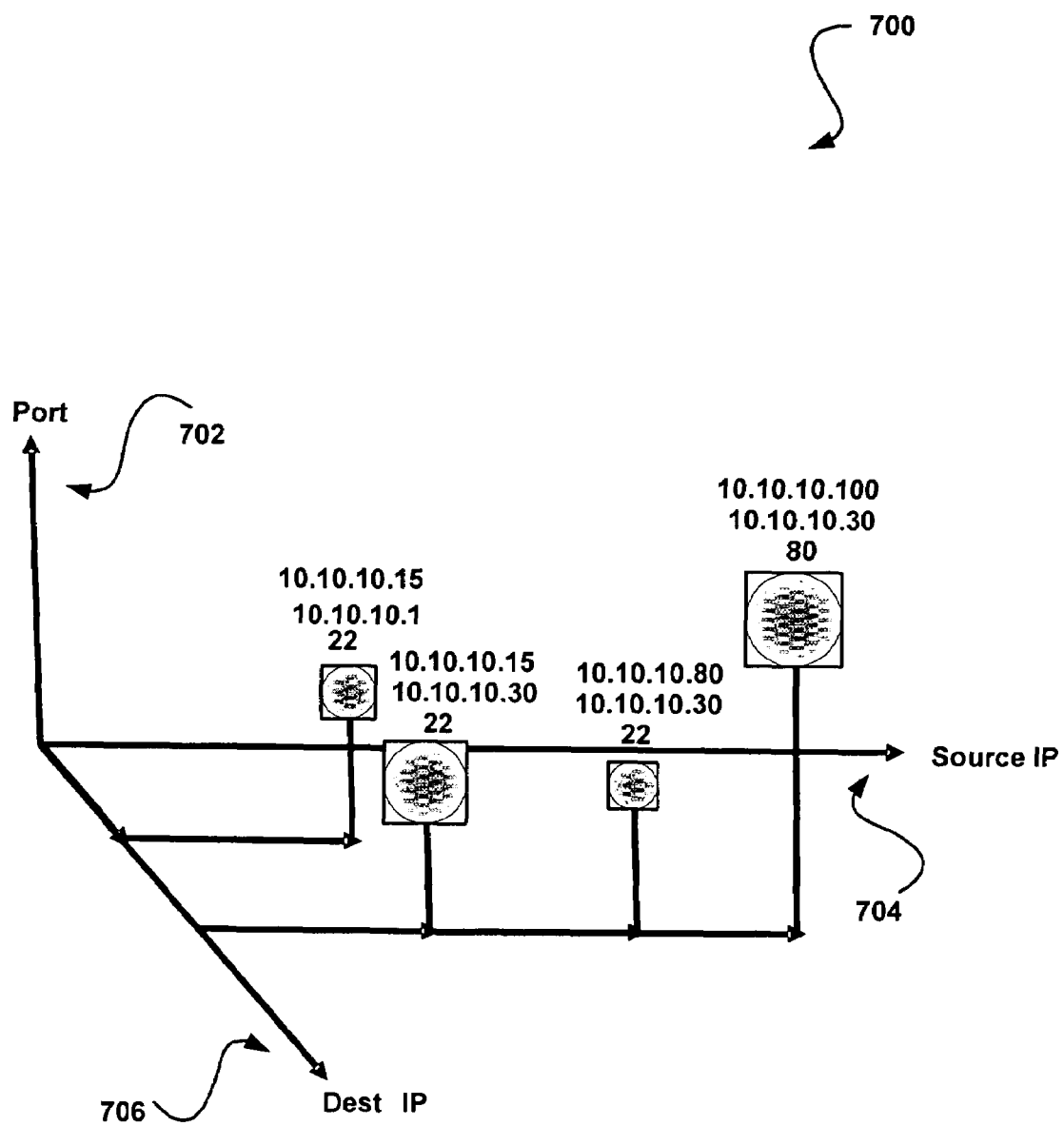
FIG. 7 shows a summary map generated by a correlation unit, in accordance with even still yet another embodiment.

FIG. 7 shows a summary map 700 generated by a correlation unit, in accordance with even still yet another embodiment. As an option, the summary map 700 may be implemented in the context of the architecture and environment of FIGS. 1-6. Of course, however, the summary map 700 may be generated and/or used in any desired environment. It should also be noted that the aforementioned definitions may apply during the present description.

The summary map 700 is generated by a correlation unit based on received information. In one embodiment, the summary map 700 is a 3-dimensional feature space that represents 3-dimensional alphanumerical data vectors received as information from sensors. Of course, the summary map 700 may be of any dimension and/or format based on the type of information capable of being received from the sensors.

For instance, as described in FIG. 4, information may be classified utilizing any number of type identifiers. Thus, the dimensions of the summary map 700 may be associated with the number of different type identifiers available to be used by sensors. As also described in FIG. 4, information may include a type identifier and an associated value. In the context of a summary map 700, the associated value may be used as a coordinate for plotting the information on the summary map 700.

The exemplary summary map 700 shown in FIG. 7 includes 3-dimensions: a destination port dimension 72, a source internet protocol (IP) address dimension 704, and a destination IP address dimension 706. Thus, in the present example, the only information received from sensors includes 3-dimensional alphanumerical data vectors with components of a destination port, a source IP address and a destination IP address. In use, a correlation unit receives the 3-dimensional alphanumerical data vectors and plots such vectors on the summary map 700. Table 2 illustrates the exemplary 3-dimensional alphanumerical data vectors utilized in the summary map 700 of FIG. 7.

TABLE 2

Vector 1: [22, 10.10.10.1, 10.10.10.15]
Vector 2: [22, 10.10.10.30, 10.10.10.15]
Vector 3: [22, 10.10.10.30, 10.10.10.80]
Vector 4: [80, 10.10.10.30, 10.10.10.100]

As shown, each component of the vectors defined in Table 2 is plotted on the summary map 700 as a coordinate. Once the vectors are plotted on the summary map 700, the correlation unit analyzes the summary map 700 and detects areas in the summary map that contain a predefined number of vectors. In addition, the correlation unit may group all vectors within a detected area of the summary map 700 utilizing a locality preserving dimensionality reduction and clustering algorithm. Such algorithm may place vectors containing similar or related components adjacently, such that the vectors may be identified as being related. In this way, if a specified number of vectors are identified as related, such grouping may be determined by the correlation unit to be indicative of an attack or of any type of undesirable activity, for example.

The correlation unit may then utilize rules, such as a policy or heuristics, for notifying sensors associated with the grouped vectors. Specifically, the correlation unit may transmit information about the components of the vectors found in the detected area along with instructions for the sensor on how to respond to any related activity. In this way, sensors are able to respond to emerging threats detected within the summary map 700. Further, in one embodiment, the data may be used for informational purposes only, in order to indicate possible malicious behavior on elements associated with the sensors.

In one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by sub-national groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems. Thus, by optionally incorporating the present technology into the cyber-frameworks of the foregoing potential targets, terrorism may be countered by generating responses and reacting based on correlated data, etc., which may be used to combat cyber-terrorism.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
    receiving information from a plurality of sensors associated with at least one computer, the information relating to events that have occurred at the at least one computer;
    correlating the information;
    conditionally reacting based on the information;
    generating a map of the information utilizing at least one correlation unit;
    creating instructions based on the map at the at least one correlation unit; and
    transmitting the instructions to at least one of the sensors;
    wherein the instructions are transmitted as a data vector;
    wherein the data vector is a 3-dimensional data vector that comprises:
        a destination port dimension;
        a source internet protocol (IP) address dimension; and
        a destination IP address dimension; and wherein values in the 3-dimensional data vector are utilized as coordinates for plotting the information on the map.

2. The method of claim 1, wherein the sensors include software processes.

3. The method of claim 1, wherein the sensors include hardware units.

4. The method of claim 1, wherein the information is correlated utilizing the at least one correlation unit.

5. The method of claim 1, wherein the information identifies potentially undesirable activity detected by the sensors.

6. The method of claim 1, wherein the information is translated into a hash at the plurality of sensors.

7. The method of claim 1, wherein the plurality of sensors filter the information prior to the information being correlated.

8. The method of claim 1, further comprising transmitting the information from the plurality of sensors to the at least one correlation unit utilizing a first abstract transmission protocol, where the at least one correlation unit correlates the information.

9. The method of claim 8, wherein the first abstract transmission protocol transforms the information into a universal format.

10. The method of claim 8, wherein the information and the instructions are transmitted with a severity indicator, location information for routing, a timestamp, and sensor type information.

11. The method of claim 1, further comprising transmitting the map or a derivative of the map from the at least one correlation unit to an additional correlation unit at a next hierarchical level.

12. The method of claim 1, wherein the instructions identify at least one action to be taken by the at least one sensor.

13. The method of claim 8, wherein the instructions are transmitted to the at least one sensor utilizing a second abstract transmission protocol, the second abstract transmission protocol having a universal format.

14. The method of claim 8, wherein the information and the instructions are each transmitted as data vectors.

15. The method of claim 5, wherein each element in each data vector includes a type identifier and an associated value.

16. The method of claim 8, wherein the information and the instructions are transmitted with at least one of a severity indicator, location information for routing, a timestamp, and sensor type information.

17. The method of claim 1, wherein the reacting is carried out to counter terrorism by generating responses and reacting based on the correlated information.

18. A computer program product embodied on a computer readable medium, comprising:
   computer code for receiving information from a plurality of sensors associated with at least one computer, the information relating to events that have occurred at the at least one computer;
   computer code for correlating the information;
   computer code for conditionally reacting based on the information;
   computer code for generating a map of the information utilizing at least one correlation unit;
   computer code for creating instructions based on the map at the at least one correlation unit; and
   computer code for transmitting the instructions to at least one of the sensors;
   wherein the instructions are transmitted as a data vector;
   wherein the data vector is a 3-dimensional data vector that comprises:
      a destination port dimension;
      a source internet protocol (IP) address dimension; and
      a destination IP address dimension; and
   wherein values in the 3-dimensional data vector are utilized as coordinates for plotting the information on the map.

19. A system, comprising:
   a plurality of sensors associated with at least one computer for communicating information utilizing a network, the information relating to events that have occurred at the at least one computer;
   at least one correlation unit for receiving and correlating the information, the at least one correlation unit further adapted to generate a map of the information;
   creating instructions based on the map, and transmit the instructions to at least one of the sensors;
   wherein the instructions are transmitted as a data vector;
   wherein the data vector is a 3-dimensional data vector that comprises:
      a destination port dimension;
      a source internet protocol (IP) address dimension; and
      a destination IP address dimension; and
   wherein values in the 3-dimensional data vector are utilized as coordinates for plotting the information on the map.

* * * * *